United States Patent [19]

Ganiaris

[11] 3,795,058

[45] Mar. 5, 1974

[54] GRID FOR FLUIDIZED BED APPARATUS

[75] Inventor: Neophytos Ganiaris, Riverdale, N.Y.

[73] Assignee: Struthers Scientific and International Corporation, New York, N.Y.

[22] Filed: June 6, 1972

[21] Appl. No.: 260,146

[30] Foreign Application Priority Data

June 6, 1971  Great Britain............... 28757/71

[52] U.S. Cl............................. 34/57 D, 159/DIG. 3
[51] Int. Cl........................................... F26b 17/10
[58] Field of Search.......... 34/10, 57 R, 57 A, 57 D; 159/4 A, 4 CC, 4 VM, DIG. 3

[56] References Cited
UNITED STATES PATENTS

| 3,417,978 | 12/1968 | Suzukawa et al............... 34/57 A X |
| 3,711,962 | 1/1973 | Fukuyo............................... 34/57 D |
| 3,411,465 | 11/1968 | Shirai................................. 34/57 D |
| 3,398,718 | 8/1968 | Pilloton.............................. 34/57 A |
| 3,298,792 | 1/1967 | DiDrusco....................... 159/DIG. 3 |

FOREIGN PATENTS OR APPLICATIONS

| 584,485 | 10/1959 | Canada.......................... 159/DIG. 3 |

Primary Examiner—Meyer Perlin
Assistant Examiner—William C. Anderson

[57] ABSTRACT

A flat conical grid at the bottom of a container for forming a fluidized bed therein contains a central opening for granules removal and has a rotary scraper on the upper surface of the grid driven by a shaft extending through the central opening.

1 Claim, 2 Drawing Figures

FEED

GRID FOR FLUIDIZED BED APPARATUS

DESCRIPTION OF THE PREFERRED EMBODIMENT

Figure 1:
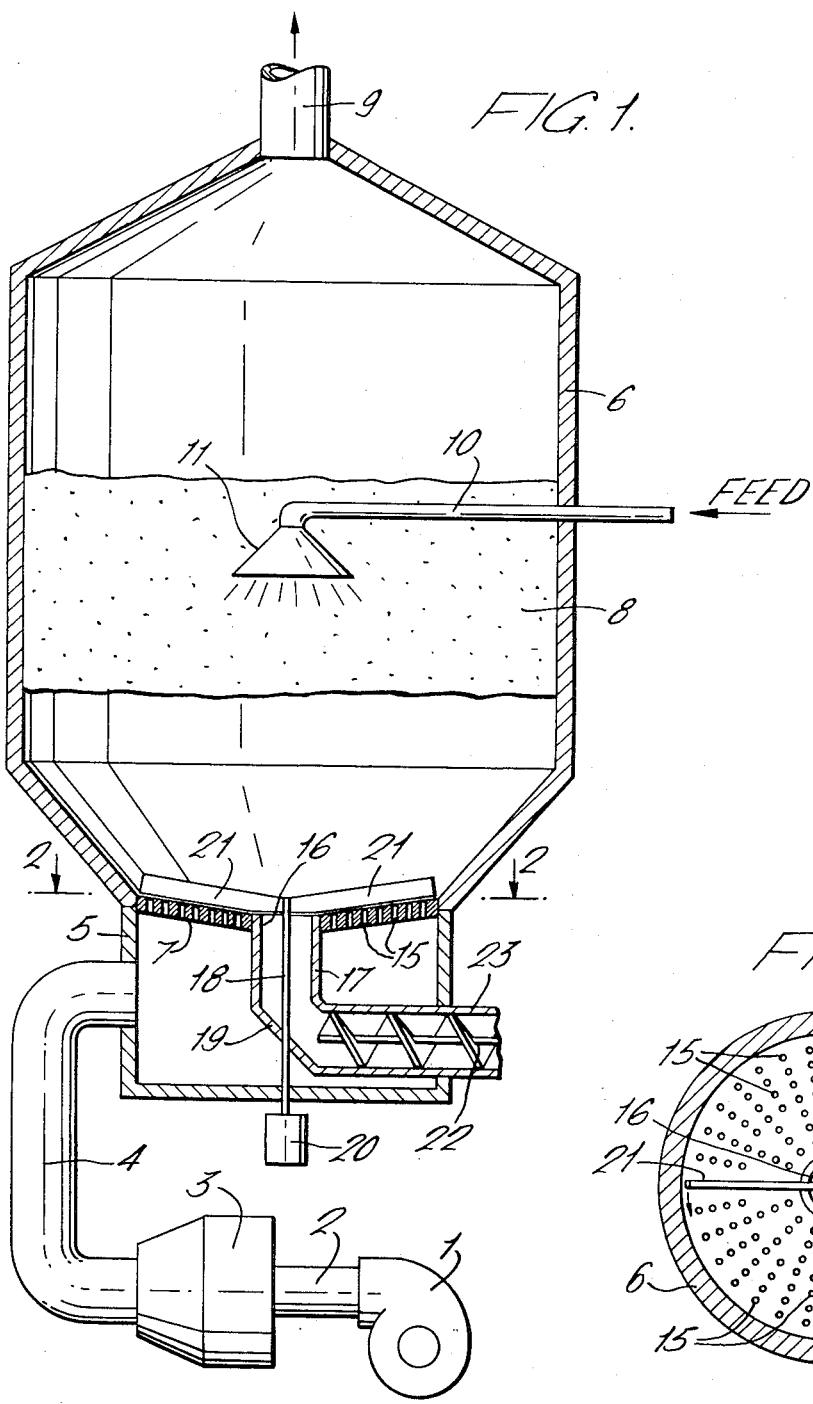
FIG. 1 is a vertical section through a container for forming a fluidized bed therein.
Figure 2:
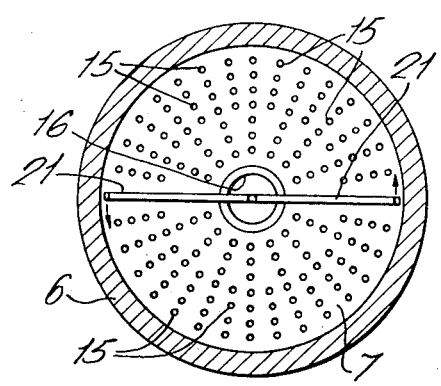
FIG. 2 is a horizontal section taken on line 2—2 of FIG. 1.

If the apparatus of this invention is used as a fluidized bed dryer, blower 1 passes air through duct 2 to combustion chamber 3 from which hot air passes through duct 4 to the bottom compartment 5 of chamber 6. The hot air passes upward through the perforated grid 7 to rise upward in chamber 6 to form fluidized bed 8 and pass from chamber 6 through duct 9. Feed from pipe 10 is introduced into chamber 6 to be sprayed from heat 11 into bed 8. Feed will then coat the particles of bed 8 and liquid will evaporate therefrom to grow granules. When the granules reach a given size, they will fall downward onto grid 7.

Grid 7 contains perforations 15 and is formed as a shallow cone with an angle between 6° to 10° with the horizontal. The center of grid 7 contains a central opening 16 about which product pipe 17 extends downward. A vertical shaft 18 passes upward in pipe 17 to have the scraper blades 21 fixed thereto. Shaft 18 passes through the sloping bottom wall 19 of pipe 18 to be driven slowly by motor 20. This rotates blades 21 which scrape large particles from grid 7 to roll down its conical surface through opening 16 to be collected by screw conveyor 22 in tube 23.

This apparatus may be used in other fluidized bed applications as well as fluidized bed dryers as described. If used as a dryer, it may be used with aqueous solutions of ammonium sulphate, ferrous sulphate, or ammonium phosphate. The blades 21 prevent any buildup of material on grid 7 and thus increase the on-line operation time of the dryer.

What is claimed is:

1. In a fluidized bed dryer for granulating particles having a chamber, means passing hot air upward within said chamber, and means introducing a feed into said dryer forming a fluidized bed therein, a product removal grid comprising, in combination, a perforated grid at the bottom of said chamber, said means passing hot air upward in said chamber passing the hot air through said grid, said grid having a central opening and being a flat cone sloping upward at an angle to the horizontal between 6° and 10° disposed about said central opening, scraper blades radially disposed on the upper surface of said grid, a product removal pipe extending downward from said central opening in said grid, a shaft extending upward through said product removal pipe and said central opening having said blades mounted thereon, and means rotating said shaft so that said blades scrape large particles from said grid to roll into said opening.

* * * * *